(12) United States Patent
Lim et al.

(10) Patent No.: US 8,776,905 B2
(45) Date of Patent: Jul. 15, 2014

(54) DEVICE FOR PREVENTING FIRE IN BATTERY PACK USED FOR ELECTRIC VEHICLE

(75) Inventors: Hae Kyu Lim, Seoul (KR); Jin Ho Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 281 days.

(21) Appl. No.: 13/323,632

(22) Filed: Dec. 12, 2011

(65) Prior Publication Data
US 2013/0075116 A1 Mar. 28, 2013

(30) Foreign Application Priority Data

Sep. 26, 2011 (KR) .......................... 10-2011-0096714

(51) Int. Cl.
*A62C 8/00* (2006.01)
(52) U.S. Cl.
USPC .................................. 169/49; 169/61; 169/62
(58) Field of Classification Search
USPC ........ 169/54, 62, 48–50, 56, 60, 61; 454/155, 454/156; 180/68.5
See application file for complete search history.

(56) References Cited

U.S. PATENT DOCUMENTS

| 2,296,747 | A | * | 9/1942 | Stover | 429/82 |
| 4,177,716 | A | * | 12/1979 | Bowe et al. | 454/50 |
| 5,848,652 | A | * | 12/1998 | Bennett | 169/62 |
| 7,661,370 | B2 | * | 2/2010 | Pike et al. | 105/50 |
| 2009/0111015 | A1 | * | 4/2009 | Wood et al. | 429/164 |
| 2010/0071979 | A1 | * | 3/2010 | Heichal et al. | 180/68.5 |
| 2010/0141206 | A1 | * | 6/2010 | Agassi et al. | 320/109 |
| 2010/0218962 | A1 | * | 9/2010 | Robb et al. | 169/46 |

FOREIGN PATENT DOCUMENTS

| JP | 10-247527 | 9/1998 |
| JP | 11-222027 | 8/1999 |
| JP | 2005-071759 A | 3/2005 |
| KR | 10-2007-0035640 | 4/2007 |

* cited by examiner

*Primary Examiner* — Christopher Kim
(74) *Attorney, Agent, or Firm* — Edwards Wildman Palmer LLP; Peter F. Corless

(57) ABSTRACT

Disclosed is a device for preventing fire in a battery pack used a battery powered vehicle. In particular, a battery pack housing is installed and configured to cover the battery pack, and includes an inlet and an outlet to circulate air therein. A fire sensor is provided in the battery pack housing and detects/senses gas when a fire occurs in the battery pack. In response, a damper installed in each of the inlet and the outlet, is configured to selectively open or close the inlet and the outlet based upon signals from a controller that is configured to send opening signals or a closing signals to the damper depending on whether the fire sensor detects gas or not.

5 Claims, 3 Drawing Sheets

DEVICE FOR PREVENTING FIRE IN BATTERY PACK USED FOR ELECTRIC VEHICLE

CROSS-REFERENCE TO RELATED APPLICATION

This application claims under 35 U.S.C. §119(a) the benefit of Korean Patent Application No. 10-2011-0096714 filed on Sep. 26, 2011, the entire contents of which are incorporated herein by reference.

BACKGROUND (a) Technical Field

The present disclosure relates to a device that prevents fire in a battery pack used for an electric vehicle and maintains cooling performance of a battery while at the same time capable of diffusing a fire by cutting off the supply of oxygen to a fire outbreak point.

(b) Background Art

In general, high-voltage batteries have customarily been used in electric vehicles, hybrid vehicles and/or fuel cell vehicles to supply electric power to the driving components (i.e., a motor of the vehicles. The high-voltage battery includes a battery pack capable of generating high voltage by connecting a plurality of battery units or modules which in combination generate a high voltage.

The energy stored in the high-voltage battery is transferred to a motor through an inverter to be used for starting the vehicle, accelerating the vehicle, driving a vehicle at a high efficiency point, and the like and when surplus energy is generated from the engine, the surplus energy is stored in the high-voltage battery by using the motor as a generator.

High-voltage batteries consume a significantly large amount of current, and as a result, high-voltage batteries generate a significantly large amount of heat from the inside thereof. Therefore, a cooling system for cooling the high-voltage battery is often provided in vehicles that use these types of batteries.

Since come cooling systems are not always sufficient, the battery can overheat due to an excessive amount of current or short circuiting. To combat the possibility of fire, a module for extinguishing the fire has been provided in some conventional designs.

FIG. 1 shows a conventional battery pack. In FIG. 1, a tube 130 is provided in an empty space among a plurality of cylindrical battery cells 110. The tube 130 contains a capsule 150 charged with a fire extinguishing material. That is, when fire occurs due to an abnormal operation of the battery, the capsule expands and bursts due to heat, and the fire extinguishing material contained in the capsule is diffused to extinguish the fire.

However, when the capsule bursts when the fire occurs, the capsule needs to be re-charged with the extinguishing material and re-installed in the battery pack in order to reuse the battery pack again after each time the capsules are extinguished. Thus, their use is limited and can be costly, especially since these battery packs can be re-used.

Furthermore, the capsules burst at predetermined locations. Therefore, fire extinguishing material contained in the capsule may not be accurately diffused to a fire outbreak point effectively, and as a result, the fire may not always be completely extinguished.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to provide a device which prevents fire in a battery pack used in a battery powered vehicle that diffuses fire within the battery pack by cutting off the supply of oxygen to a fire outbreak point. Further, the present invention has been made in an effort to provide a battery pack used in a battery powered vehicle that maintains cooling performance of a battery while driving a vehicle and charging the battery.

In one aspect, the present invention provides a device for preventing fire in a battery pack used in a battery powered vehicle which includes a battery pack housing covering a battery pack. The battery pack housing includes an inlet and an outlet to circulate air therein. A fire sensor is provided in the battery pack housing senses gas when fire occurs in the battery pack. When fire is sensed by the sensor, a damper installed in each of the inlet and the outlet, is configured to selectively open or close the inlet and the outlet accordingly to cut off oxygen to the point of fire. A controller is configured to transfer an opening signal or a closing signal to the damper depending on whether gas in the battery pack housing is sensed or not.

Herein, the damper may include a rotational shaft installed by crossing the inside of each of the inlets and the outlets, and a cut-off plate configured to rotate together with a rotational shaft on which it is installed and formed so that an outer periphery of the cut-off plate corresponds to inner peripheries of the inlet and the outlet to cut-off air flow therein when a fire occurs. Furthermore, an actuator is connected to the rotational shaft and is configured to transfer a rotational force to the rotational shaft upon receiving a signal from the controller. That is, The controller may transfer a closing signal to the damper when the fire sensor senses gas and transfer an opening signal to the damper when the fire sensor does not sense gas.

Further, the controller may transfer an opening signal to the damper to cool the battery pack when current for driving the vehicle is consumed in the battery or when the battery is fully charged, and transfer the closing signal to the damper when the current for driving the vehicle is not consumed in the battery.

In some embodiments of the present invention, an impurity preventer may be installed in upper portions of the inlet and the outlet to cover the inlet and the outlet accordingly.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
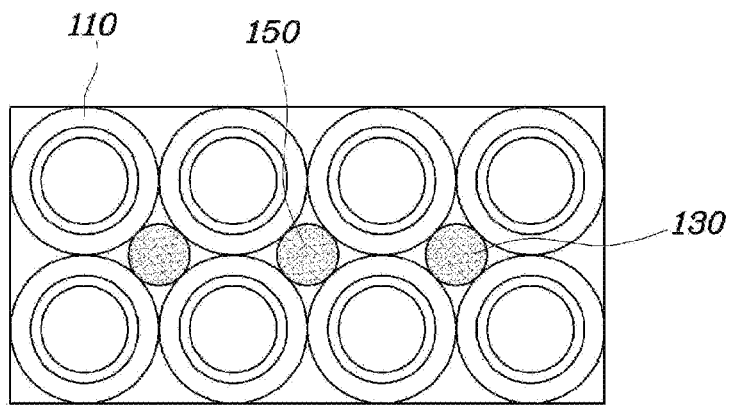
FIG. 1 is a cross-sectional view of a battery pack in the conventional art.
Figure 2:
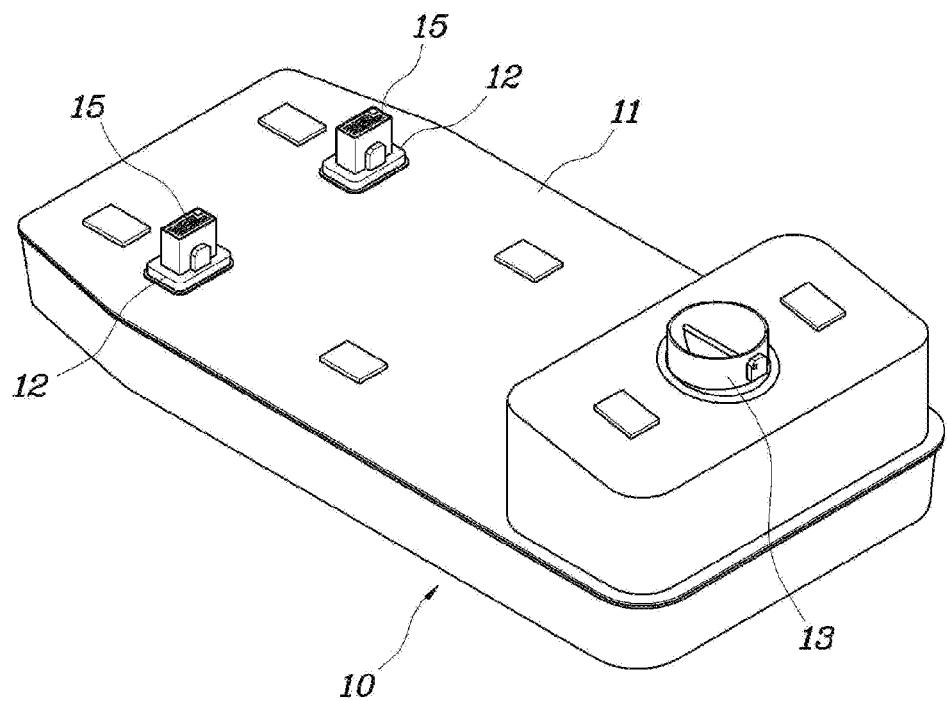
FIG. 2 is a perspective view of a battery pack for an electric vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

FIGS. 2 to 5 show a device for preventing fire in a battery pack used in a battery powered vehicle according to an exemplary embodiment of the present invention and the device includes a battery pack housing 11, a fire sensor 20, a damper 30, and a controller 40. When described by FIGS. 2 and 5, the battery pack housing 11 is configured and installed to cover the battery pack 10, and includes an inlet 12 and an outlet 13, such that air is circulated in the battery pack housing 11. In addition, the fire sensor 20 is provided in the battery pack housing 11 to sense gas when fire occurs in the battery pack 10. Further, a damper 30 is installed in each of the inlet 12 and the outlet 13 and is provided to selectively open or close the inlet 12 and the outlet 13. In addition, in the controller 40, an opening signal or a closing signal is transferred to the damper 30 depending on whether the fire sensor 20 senses gas or not.

Herein, the fire sensor 20 may be embodied as a smoke sensor or a $CO_2$ sensor. In addition, the controller 40 may be embodied as a battery management system (BMS).

In particular, the opening signal or the closing signal may be transferred to the damper 30 in the controller 40 depending on whether the fire sensor 20 senses gas or not and the damper 30 may rotate depending upon the signal to open or close the inlet 12 and the outlet 13. Accordingly, the damper 30 closes the inlet 12 and the outlet 13 to cut off the supply of air to the inside of the battery pack 10 when a corresponding gas is detected by the sensor, and as a result, fire is extinguished.

Figure 3:
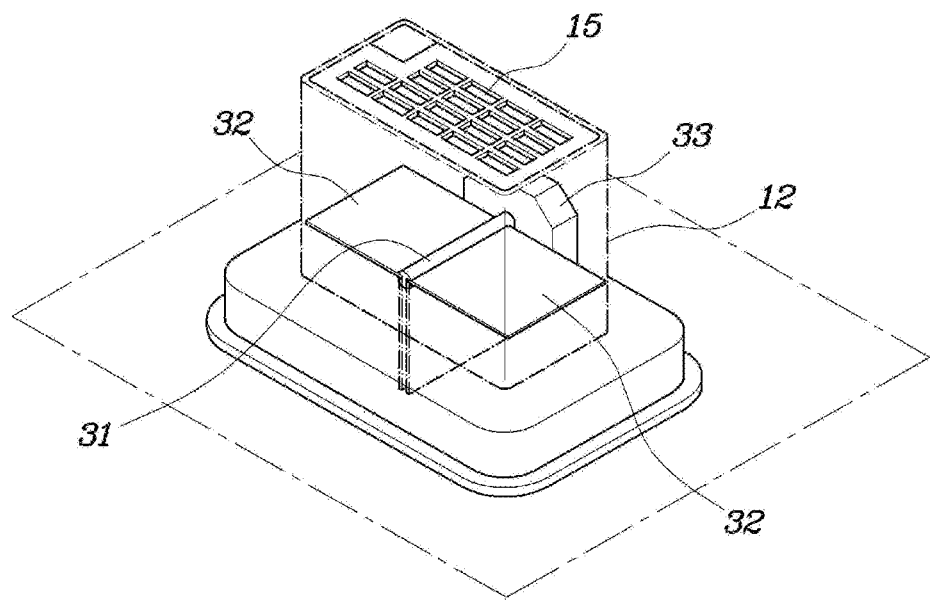
FIG. 3 is a perspective view of a damper installed at an inlet according to an exemplary embodiment of the present invention.
Figure 4:
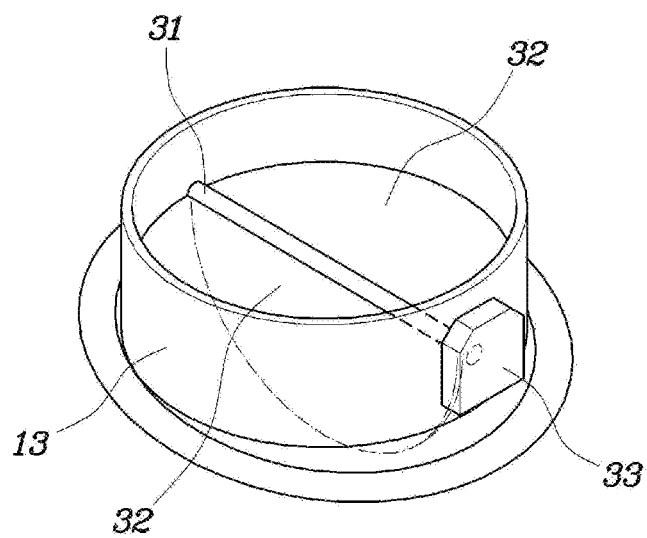
FIG. 4 is a perspective view of a damper installed at an outlet according to an exemplary embodiment of the present invention.
Figure 5:
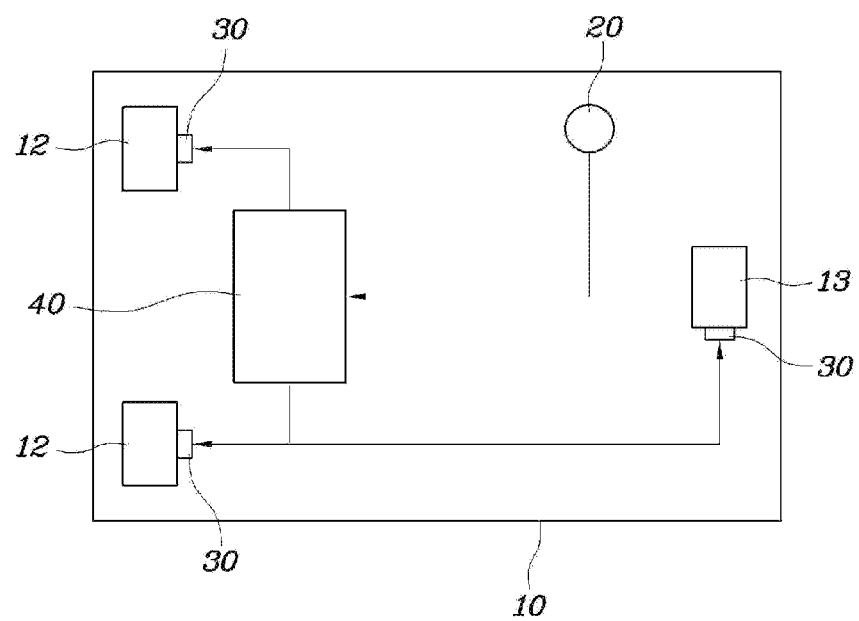
FIG. 5 is a circuit diagram of a device for preventing fire in a battery pack according to an exemplary embodiment of the present invention.

Moreover, a configuration of the damper 30 will be described in detail with reference to FIGS. 3 and 4. The damper 30 includes a rotational shaft 31, a cut-off plate 32, and an actuator 33 again. The rotational shaft 31 is installed and configured to cross the inside diameter of each of the inlet 12 and the outlet 13. In addition, the cut-off plate 32 is installed and configured to rotate together while being installed and configured on the rotational shaft 31 and is formed so that an outer periphery of the cut-off plate 32 corresponds to inner peripheries of the inlet 12 and the outlet 13 when a fire occurs. Further, the actuator 33 is connected to the rotational shaft 31 and transfers rotational force to the rotational shaft 31 upon receiving the signal from the controller 40.

That is, when the opening signal or the closing signal is transferred from the controller 40 to the actuator 33, the actuator 33 is actuated to rotate the rotational shaft 31 and the cut-off plate 32 installed on the rotational shaft 31, such that the cut-off plate 32 rotates together with the rotational shaft 31. Accordingly, when a fire occurs, the cut-off plate 32 rotates to close the inlet 12 and the outlet 13 accordingly.

In this case, the inlet 12 and the outlet 13 protrude outwards in a form of a cylindrical circular shape or tubular rectangular shape as shown in the figures, but the shapes of the inlet 12 and the outlet 13 are not limited these shapes.

Further, the cut-off plate 32 is formed to be closely attached to peripheries of inner surfaces of the inlet 12 and the outlet 13 when fire occurs. Therefore, the cut-off plate 32 should have the same shape as the shapes of the inlet 12 and the outlet 13. However, the outer periphery of the cut-off plate 32 may be slightly equal to or larger than the inner peripheries of the inlet 12 and the outlet 13.

In addition, both sides of the cut-off plate 32 may hingedly-rotate below the rotational shaft 31 or horizontally to the rotational shaft 31. That is, the cut-off plate 32 may be configured to hingedly-rotate around the rotational shaft 31 while both sides of the cut-off plate 32 face each other. The configuration is also included in the configuration of the present invention.

The rotational shaft 31 may be configured and installed to be positioned at internal centers of the inlet 12 and the outlet 13, but in some cases, the rotational shaft 31 may be installed at a position eccentric to one side in the inlet 12 and the outlet 13.

In addition, an impurity preventer 15 may be installed in upper portions of the inlet 12 and the outlet 13 to further cover the inlet 12 and the outlet 13. Herein, the impurity preventer 15 is formed by a plurality of small-sized holes and serves as a filtering mechanism which is configured to filter impurities while passing air.

That is, air may pass through the impurity preventer 15 while preventing the impurity from flowing into the inlet 12 and the outlet 13 through the impurity preventer 15. The controller 40 may be configured to transfer the closing signal to the damper 30 when the fire sensor 20 senses gas and transfers the opening signal to the damper 30 when the fire sensor 20 does not sense gas.

That is, normally when a fire sensing signal is not detected by the fire sensor 20 while the vehicle is operating, the controller 40 continually or intermittently transfers the opening signal to the actuator 33, and as a result, the actuator 33 rotates the cut-off plate 32 to an open mode together with the rotational shaft 31. Accordingly, the inlet 12 and the outlet 13 are opened, so that air flows into the battery pack 10 to maintain the cooling performance of the battery.

On the contrary, as the fire occurs in the battery pack 10 due to an abnormal operation by short-circuit or high current regardless of whether the vehicle is driven, when gas is sensed by the fire sensor 20, the fire sensing signal is transferred from the fire sensor 20 to the controller 40 and the controller 40 receives the signal from the fire sensing signal 20 to transfer the closing signal to the actuator 33. As a result, the actuator 33 is driven to rotate the cut-off plate 32 to a closing mode together with the rotational shaft 31, thereby closing the inlet 12 and the outlet 13 through the cut-off plate 32.

By preventing air from flowing into the battery pack 10, the fire is extinguished, often at an early stage. Moreover, when current for driving the vehicle is consumed in the battery, the controller 40 transfers the opening signal to the damper 30 to cool the battery pack 10 and when the current for driving the vehicle is not consumed in the battery, the controller 40 transfers the closing signal to the damper 30.

That is, when the current for driving the vehicle is consumed in the battery, the controller 40 transfers the opening signal to the actuator 33, and as a result, the actuator 33 rotates the cut-off plate 32 to the open mode together with the rotational shaft 31. Accordingly, the inlet 12 and the outlet 13 are opened, so that air flows into the battery pack 10 to maintain the cooling performance of the battery.

On the contrary, when the current for driving the vehicle is not consumed in the battery, the controller 40 transfers the closing signal to the actuator 33, and as a result, the actuator 33 rotates the cut-off plate 32 to a closing mode together with the rotational shaft 31. Accordingly, the inlet 12 and the outlet 13 are closed to prevent air and impurities from flowing into the battery pack 10, thereby preventing a fire from occurring in advance.

In addition, when the battery is charged, the controller 40 transfers the opening signal to the damper 30 to cool the battery pack 10. That is, when the battery is charged regardless of whether it is in a slow charging mode or a rapid charging mode, the controller 40 transfers the opening signal to the actuator 33, and as a result, the actuator 33 is driven to rotate the cut-off plate 32 to the open mode together with the rotational shaft 31. Accordingly, the inlet 12 and the outlet 13 are opened, so that air flows into the battery pack 10 to maintain the cooling performance of the battery.

According to an exemplary embodiment of the present invention, as fire occurs in the battery pack due to short-circuit or an abnormal operation, when gas is sensed by a fire sensor, a damper closes an inlet and an outlet to prevent air from flowing into the battery pack, and as a result, the fire is diffused, thereby reducing damage to a vehicle and a life. Further, when current for driving the vehicle is not consumed in a battery, the damper closes the inlet and the outlet to prevent air from flowing into the battery pack, and as a result, the fire can be prevented from occurring in advance. Moreover, the damper opens the inlet and the outlet while the vehicle is operating or when the battery is fully charged to circulate air in the battery pack, and as a result, cooling performance of the battery can also be maintained.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A device for preventing fire in a battery pack used in an electric vehicle, comprising:
   a battery pack housing installed and configured to cover the battery pack, the battery pack housing including an inlet and an outlet to circulate air therein;
   a fire sensor disposed in the battery pack housing and configured to sense one or more gases when fire occurs in the battery pack;
   a damper disposed in each of the inlet and the outlet and configured to selectively open and close the inlet and the outlet depending upon whether or not gas has been sensed; and
   a controller configured to transfer an opening signal or a closing signal to the damper depending on whether the fire sensor senses gas or not,
   wherein the damper includes:
      a rotational shaft installed across an inside of each of the inlet and the outlet;
      a cut-off plate configured to rotate together with the rotational shaft and formed so that an outer periphery of the cut-off plate corresponds to inner peripheries of the inlet and the outlet when the damper is shut; and
      an actuator connected to the rotational shaft and configured to transfer a rotational force to the rotational shaft upon receiving a signal from the controller.

2. The device for preventing fire in a battery pack of claim 1, wherein the controller transfers a closing signal to the damper when the fire sensor senses gas and transfers an opening signal to the damper when the fire sensor does not sense gas wherein when a the damper is closed the fire is extinguished.

3. The device for preventing fire in a battery pack of claim 1, wherein the controller transfers the opening signal to the damper to cool the battery pack when current for driving the vehicle is consumed in the battery and transfers the closing signal to the damper when the current for driving the vehicle is not consumed in the battery.

4. The device for preventing fire in a battery pack of claim 1, wherein the controller transfers the opening signal to the damper to cool the battery pack when the battery is charged.

5. The device for preventing fire in a battery pack used for an electric vehicle of claim 1, wherein an impurity preventer is installed in upper portions of the inlet and the outlet to cover the inlet and the outlet and prevent impurities from entering the or exiting the inlet or outlet.

* * * * *